United States Patent
Case

[11] 3,881,396
[45] May 6, 1975

[54] PORTABLE BORING BAR

[75] Inventor: Charles E. Case, Virginia Beach, Va.

[73] Assignee: Ernest E. Grimsley, Portsmouth, Va.

[22] Filed: Mar. 1, 1974

[21] Appl. No.: 447,261

[52] U.S. Cl. .................................. 90/12.5; 408/80
[51] Int. Cl. .............................................. B23c 1/20
[58] Field of Search ................. 90/12.5; 408/80, 81

[56] References Cited
UNITED STATES PATENTS

| | | | |
|---|---|---|---|
| 400,989 | 4/1889 | Wright | 90/12.5 |
| 692,459 | 2/1902 | Langlois | 90/12.5 |
| 814,418 | 3/1906 | Williams | 90/12.5 |
| 934,642 | 9/1909 | Williams | 90/12.5 |
| 1,085,832 | 2/1914 | Westerheide | 90/12.5 X |
| 1,186,403 | 6/1916 | Johnson | 90/12.5 |
| 2,959,109 | 11/1960 | Buchan | 408/80 X |
| 3,068,725 | 12/1962 | Nooy | 408/81 |

*Primary Examiner*—Andrew R. Juhasz
*Assistant Examiner*—Leon Gilden
*Attorney, Agent, or Firm*—Griffin, Branigan and Butler

[57] ABSTRACT

A small compact and light-weight tool is provided which is capable of boring and honing in-situ the seal ring seats of different sizes of high pressure valves. The tool housing is threaded so that after removal of the valve stem and top the tool may be screwed into the valve body. An arbor bar extends through the housing, the arbor bar carrying a cutting tool holder at one end and being adapted at the other end to be driven rotationally by a drive motor. Bearings support the arbor bar for free rotational movement. One part of the housing is externally threaded and provided with slots. Means including a manually rotated feed ring screwed onto the housing transmits a force through the slots to move the arbor bar axially. Adaptor elements, screwed onto the housing, permit use of the tool on different size valves, or valves with internal or external threads on the valve body.

10 Claims, 5 Drawing Figures

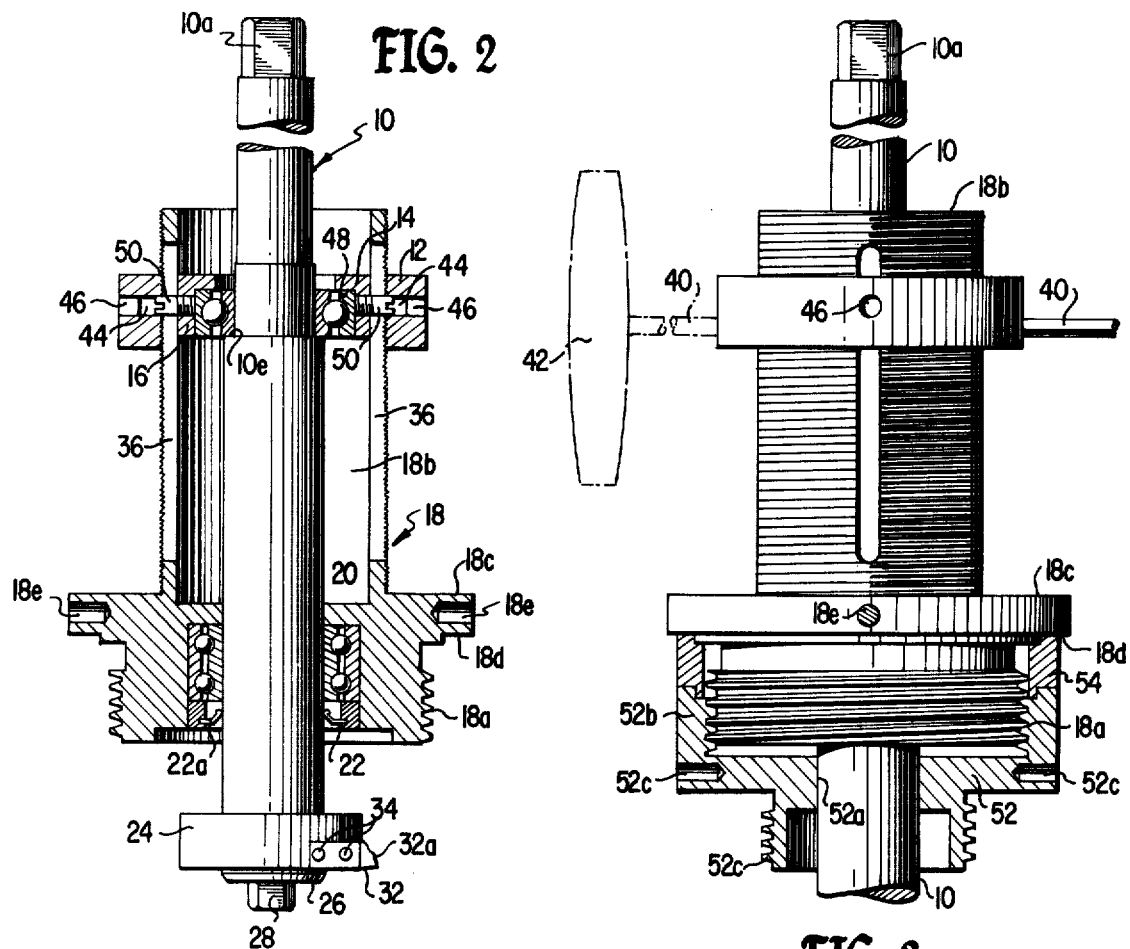
FIG. 2
FIG. 3
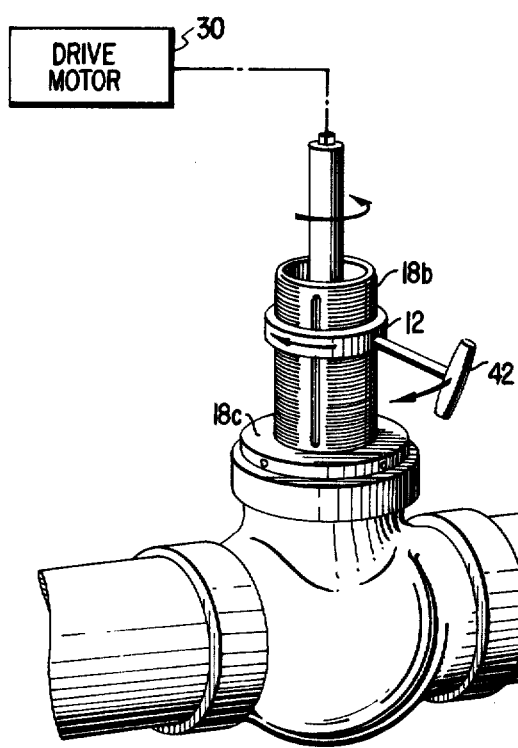
FIG. 5
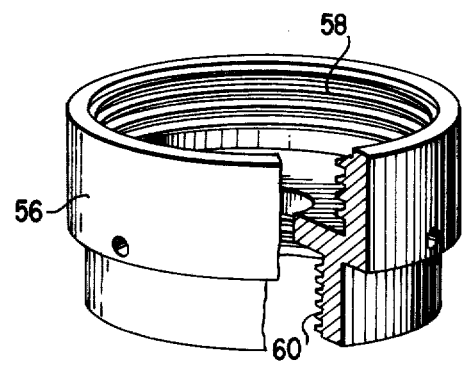
FIG. 4

PORTABLE BORING BAR

BACKGROUND OF THE INVENTION

In the past, it has been extremely difficult and expensive to replace the metal seal rings of high pressure steam valves such as those found in power plants and on naval vessels. Typically, valves of this type come in a range of sizes (1½– 12 inch) and must be extremely heavy in order to function properly in systems where the steam pressure may range from 600 to 1500 psi. Because the valves are welded in the steam lines in which they are used, it is extremely difficult and very expensive to remove the valves from the system for transporting them to a shop for repair. Typically it costs several thousand dollars for the shop repair and reinstallation of one small valve and upwards to ten thousand dollars to repair one valve over the six inch size. On the other hand, it is also difficult and, more often than not, impossible to repair the valves without removing them from the system. This is due in part to the fact that the valves are often located in small spaces impeded by piping and other valves so that it is impossible to reach them with the bulky tools presently available for refinishing the valve seal ring seats. It is also due to the fact that the prior art tools are extremely heavy. This is particularly true where the valve, though accessible, is located near a bulkhead or near a compartment ceiling. A typical prior art tool for refinishing the seal ring seats of such valves weighs approximately 900 to 1000 pounds and requires the services of three men for several hours in order to set it up in proper alignment for the refinishing of one valve seal ring seat.

SUMMARY OF THE INVENTION

An object of the present invention is to provide a portable tool for refinishing the seal ring seats of high pressure valves.

An object of the present invention is to provide a compact boring bar which can be transported ans set up by one man to bore and refinish the surfaces of seal ring seats in high pressure valves.

In accordance with the principles of the present invention, a tool for refinishing the seal ring seating surface in a valve comprises a housing member adapted to be screwed onto the body of the valve, an arbor bar extending through bearing means inside said housing and adapted at one end thereof to be rotationally driven, a cutting tool and tool holder on the other end of the arbor bar exterior of the housing, a manually rotatable element screwed onto the exterior of the housing, and means responsive to the manually rotated element for advancing the arbor bar in the direction of its own axis to thereby feed or advance the cutting tool. The rotatable element includes an interior groove and two slots are provided in the housing. A force transmitting element surrounding the arbor bar and freely slidable in the housing is provided with two studs that extend through the slots and into the groove so that rotation of the manually rotatable element drives the force transmitting element and the arbor bar in the direction of the axis of the arbor bar.

Other objects of the invention and its mode of operation will be better understood upon consideration of the following description and accompanying drawing.

BRIEF DESCRIPTION OF DRAWINGS

FIG. 2 is a part-sectional view of an embodiment of the invention adapted for machining one size of valve having an internally threaded valve body;

FIG. 3 is a part-sectional view showing how the embodiment of FIG. 2 may be adapted to machine a valve of a different size having an internally threaded valve body;

FIG. 4 shows an adaptor element by means of which the invention may be adapted to machine valves having externally threaded valve bodies; and, FIG. 5 illustrates the position of the boring bar assembly when in actual use.

DESCRIPTION OF A PREFERRED EMBODIMENT

Figure 1:
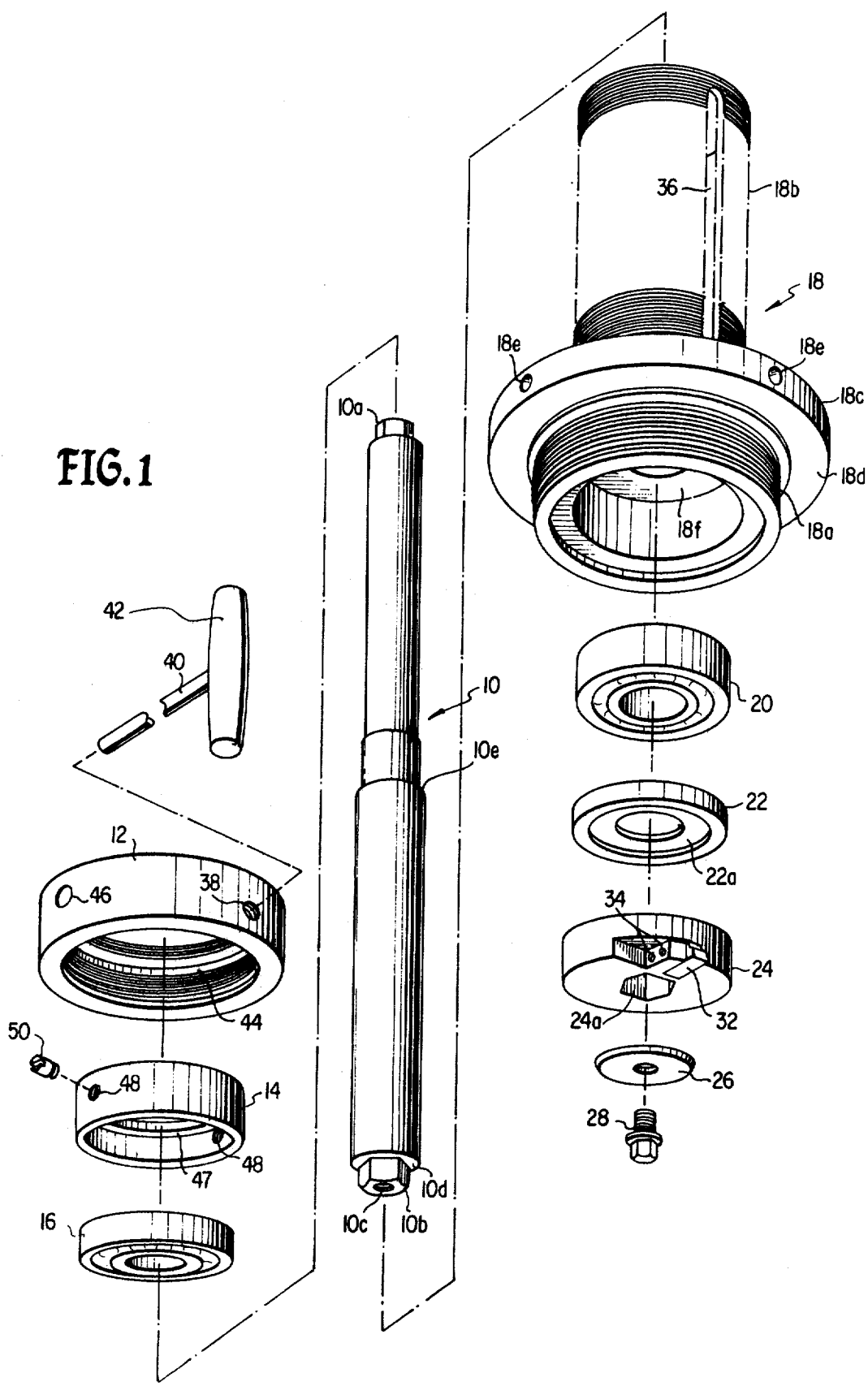
FIG. 1 is an exploded view of a portable boring bar assembly constructed in accordance with the principles of the present invention.

As illustrated in FIGS. 1 and 2, a preferred embodiment of a portable boring bar assembly constructed in accordance with the principles of the present invention comprises an arbor bar 10, a feed ring 12, a shaft bearing retainer sleeve 14, a ball bearing 16, a generally hollow housing 18, a bearing 20, a seal ring 22, a cutting tool holder 24, a washer 26, and a retaining bolt 28.

The arbor bar 10 has an hexagonally nut-shaped portion 10a at one end. In a preferred embodiment the arbor bar is driven by an electric or pneumatic motor 30 (FIG. 5) through a conventional socket wrench element which fits over the nut-shaped portion 10a. At the other end, the arbor bar is provided with a second hexagonally nut-shaped portion 10b which mates with a hole 24a in the cutting tool holder 24. Nut-shaped portion 10b mates closely with the cutting tool holder 24 so that the cutting tool holder is rotated as the motor 30 drives the arbor bar 10. The nut-shaped portion 10b is tapped at 10c (FIG. 1) to receive the retaining bolt 28. The retaining bolt extends through the washer 26 and into the nut-shaped portion 10b. The washer 26 is of the type shaped to have a peripheral engaging ring. As the retaining bolt is tightened this ring presses against the surface of the cutting tool holder thereby firmly holding the cutting tool holder against an abutment 10d on the arbor bar.

The cutting tool holder 24 has a recessed portion adapted to receive a bit or cutting tool 32 having a working edge 32a. Suitable fastening means such as Allen screws 34 extend through a portion of the cutting tool holder and secure the cutting tool in position. Thus, as the arbor bar 10 is rotated the working edge 32a of the tool follows a circular path about the axis of the arbor bar. As subsequently explained, the arbor bar is axially movable thereby permitting the working edge 32a of the tool to machine the interior cylindrical surface of a seal ring seat.

The housing 18 is perferrably machined from a single piece of metal and comprises first and second threaded portions 18a and 18b separated by an enlarged portion 18c. The diameter and threads of portion 18a are such that when the top and valve stem of a particular size valve are removed, the portion 18a may be screwed into the valve body as illustrated in FIG. 5. The enlarged portion 18c has a surface 18d which matches or seats on the top surface of the valve body. The housing may be tightened onto the valve body by means of a spanner wrench or pins inserted into one or more holes 18e provided in the peripheral surface of the enlarged portion 18c.

The bearing 20 is press fit into the housing 18 to a point where it contacts an abutment 18f (FIG. 1). The seal ring 22 having an elastomeric seal portion 22a is then pressed into the housing 18 to prevent dirt and other foreign matter from entering the bearing 20.

That portion of the housing designated 18b is threaded over substantially its entire length and is provided with two diametrically opposed slots or elongated openings 36. Feed ring 12 is provided with internal threads so that it may be screwed onto one end of housing portion 18b and then screwed along the length of the body. The feed ring is provided with two diametrically opposed threaded holes 38, one of which is shown in FIG. 1. Each of these holes receives a threaded stem 40 to which a handle 42 is attached. The feed ring is provided with an interior annular recess 44 and a pair of diametrically opposed holes 46, the purposes of which will become obvious from the following description.

The interior diameter of housing portion 18b is made slightly larger than the outer diameter of the generally annular shaft bearing retainer sleeve 14 so that the sleeve may slide freely in the axial direction within the housing. Ball bearing 16 is press fit into the retainer sleeve 14 until its outer ring engages an interior annular abutment 47 which forms part of the sleeve.

The sleeve is provided with two diametrically opposed threaded holes 48 for receiving two screw studs 50. The length of the studs 50 is such that when they are tightly screwed into the sleeve 14 they extend through the slots 36 in the housing portion 18b and into the annular groove 44 in the feed ring 12. The holes 46 in the feed ring are made slightly larger than the studs 50 so that the studs may be inserted through holes 46 and into the sleeve after the sleeve has been inserted in the interior of the housing and the feed ring has been screwed onto the exterior of the housing.

Complete assembly of the tool is accomplished as follows. Bearing 16 is press fit into the retainer sleeve 14. The smaller end of the boring bar is inserted through the assembly and the bearing 16 press fit onto the intermediate diameter of the arbor bar until the inner ring of the bearing is in contact with the abutment 10e. The feed ring 12 is screwed onto the housing portion 18b and the holes 46 aligned with slots 36. The arbor bar carrying the retainer sleeve and bearing is then inserted through the housing and the retainer sleeve turned so that holes 48 align with slots 36 and holes 46. Studs 50 are then inserted through holes 46 and slots 36 and tightened into the threaded holes 48 in the sleeve. Bearing 20, seal 22, and cutting tool holder 24 are then mounted on the opposite end of the arbor bar in the sequence named, with the tool holder being held in place by washer 26 and retaining bolt 28.

Referring to FIGS. 2 and 5, the tool is operated as follows. The top cover and valve stem of the valve are removed and the boring bar assembly mounted on the valve body by screwing housing portion 18a into the interiorly threaded valve body. A drive means such as a motor driven socket wrench is then attached to the upper end 10a of the arbor bar and when the motor is turned on the arbor bar and the cutting tool begin rotating. Actual feed of the tool and the arbor bar is accomplished by applying manual pressure to the handles 42 to rotate the feed ring 12. As the feed ring is rotated it is moved downwardly on the housing portion 18b because of the thread engaging contact between the two parts. As the feed ring moves downwardly it applies a downward force on the screw studs 50 and these studs in turn apply a downward force on the bearing retainer sleeve 14. The abutment 47 on the retainer sleeve transmits this force through the bearing 16 to the arbor bar 10 thereby moving both the arbor bar and the cutting tool downwardly. As the cutting tool is moved downwardly it cuts successive increments of the valve seal ring seating surface.

After the arbor bar has been moved axially a distance sufficient for the tool 32 to completely bore or hone the seal ring seat, the entire boring bar assembly may be removed simply by removing the drive means from the arbor bar portion 10a and applying a spanner wrench to housing portion 18c to unscrew the entire assembly from the valve body.

The boring bar assembly shown in FIG. 2 is capable of boring and honing only one size valve since the diameter and threads on the housing portion 18a must match with the threads and opening in the top of the valve body. However, adaptor units may be provided so that the boring bar assembly may be used for boring the seal ring seats of valves of different sizes and valves having either an internally or an externally threaded body.

FIG. 3 illustrates how the apparatus of FIG. 2 may be adapted for use on smaller size valves by employing an adaptor element 52 and a spacer ring 54. Adaptor element 52 is generally hollow and circularly shaped. It has a central opening 52a through which passes the arbor bar 10, a larger diameter portion 52b that is internally theaded to match with the threads on the housing portion 18a, and a smaller diameter portion 52c that is externally threaded to mate with the internal threads of a valve body. In order to reduce the weight of the tool, the adaptor element 52 may be made of aluminum.

The spacer 54 is a hollow ring, preferrably made of brass, and has one surface adapted to mate with the surface 18d of the housing and another surface adapted to mate with the adaptor element 52. The purpose of the spacer is to allow machining of a shallow depth valve throat. When the spacer is removed the unit can be used for machining extremely deep throated valves.

In order to utilize the adaptor element 52, the tool holder 24 (FIG. 2) must be removed by removing the retaining bolt 28. The spacer ring 54 and the adaptor element 52 are then inserted over the arbor bar end and the adaptor element screwed onto the threads of housing portion 18a. A spanner wrench or pins may be inserted into holes 52c in the adaptor element to securely tighten the adaptor element on the housing. The cutting tool holder may then be replaced and the tool is ready for use by screwing the adaptor element into the valve body.

The adaptor element of FIG. 3 enables a tool to be used on valves of a smaller size than the valve that can be bored by the apparatus of FIG. 2 because the diameter of adaptor portion 52c is smaller than the diameter of housing portion 18a. However, it will be understood that by providing additional adaptor elements having portions 52c of either larger or smaller diameter the apparatus of FIG. 2 may be employed to bore the seal ring seats of any size valve having an internally threaded body.

If it is desired to bore the seal ring seat of a valve having an externally threaded body, an adaptor element 56 like that shown in FIG. 4 may be employed. This adaptor has a first set of internal threads 58 which permit the element to be screwed onto the housing portion 18a (FIG. 2). The adaptor element has a second set of internal threads 60 for engaging the threads of an externally threaded valve body. The adaptor element 56 is attached to the housing 18 and employs a spacer ring 54 as described above with reference to FIG. 3.

From the foregoing description it is seen that the present invention provides a simple lightweight portable boring bar for boring and honing in-situ the seal ring surfaces of various size high pressure valves. The tool may be set up and operated by one man. It is quite small and can be used on valves with limited accessibility without requiring that the valves be removed from the system in which they are operating. Typically, a preferred embodiment of the invention may be employed to machine the seal ring seats of high pressure valves ranging in size from one and one half to twelve inches although it is not limited to use on valves of this size. The weight of the tool, including a pneumatic drive motor, is approximately 58 pounds. Since the motor is separable, the weight of the tool is such that one man may easily transport it and set it up. The actual set-up and repair time for a particular valve depends upon the condition of the bore of the valve body being repaired. If the bore is cracked, or has been scored or cut by high pressure steam so that it must first be welded, then the machining of the welded surface will take approximately 45 minutes. On the other hand, a surface in fair condition can be machined or refinished in about 25 minutes.

While the preferred embodiment of the invention has been described in detail, various modifications and substitutions may be made in the described embodiment without departing from the spirit and scope of the invention as defined by the appended claims.

The embodiments of the invention in which an exclusive property or privilege is claimed are defined as follows:

1. A tool for machining the seal ring seat in a valve, said tool comprising:
    a generally hollow housing having a first cylindrical portion threaded so that it may be screwed onto said valve, and a second cylindrical portion with external threads and first and second slots extending generally axially along said second portion;
    manually operable feed ring means having an interior annular recess and internal threads which match with the threads on the second portion of said housing, said feed ring means being mounted on said second portion of said housing whereby rotation of said feed ring means advances it axially along said housing;
    an arbor bar extending through said housing and adapted to be rotationally driven;
    cutting tool means mounted on said arbor bar at the end nearest the first cylindrical portion of said housing;
    bearing means within said housing supporting said arbor bar;
    means acting on said arbor bar,
    Means extending through said slots and into said annular recess and acting on the means acting on the arbor bar, for axially moving said arbor bar in response to rotational movement of said feed ring.

2. A tool as claimed in claim 1 wherein said cutting tool means includes a tool holder mounted on said arbor bar and a cutting tool having a working edge off center of the axis of said bar, said working edge being disposed to machine a cylindrical seal ring seat as said arbor bar is moved axially and rotationally.

3. A tool as claimed in claim 1 wherein said means for axially moving said arbor bar comprises an annular sleeve with an internal abutment disposed within the second portion of said housing, and said means extending through said slots and into said annular recess comprises studs attached to and extending outwardly from said annular sleeve.

4. A tool as claimed in claim 3 wherein said means for axially moving said arbor bar further comprises a bearing mounted on said arbor bar, said arbor bar having an abutment thereon, said bearing being disposed between said arbor bar abutment and the internal abutment of said annular sleeve whereby the force for axially moving said arbor bar is transmitted through said bearing.

5. A tool as claimed in claim 4 wherein said bearing is a ball bearing having an inner race in contact with the abutment on said arbor bar and an outer race in contact with the internal abutment of said annular sleeve.

6. A tool as claimed in claim 5 wherein said ball bearing is press fit onto said arbor bar and into said annular sleeve.

7. A tool as claimed in claim 1 wherein the arbor bar is adapted to be rotationally driven by shaping the end of the arbor bar remote from said cutting tool means as a plural sided body.

8. A tool as claimed in claim 7 and further comprising a drive motor and motor driven means adapted to mate with the plural sided portion of said arbor bar.

9. A tool as claimed in claim 2 wherein the end of said arbor bar is shaped to have plural sides and said tool holder has a mating plural sided opening therein.

10. A tool as claimed in claim 1 and further comprising handle means extending radially from said feed ring means for holding the tool and rotating said feed ring.

* * * * *